Aug. 6, 1929.  T. BURNHAM  1,723,228
SPEED RECORDER
Filed June 15, 1925  7 Sheets-Sheet 1

Inventor.
T. Burnham

Aug. 6, 1929.  T. BURNHAM  1,723,228
SPEED RECORDER
Filed June 15, 1925  7 Sheets-Sheet 3

Inventor.
T. Burnham
by ... Attys.

Aug. 6, 1929.  T. BURNHAM  1,723,228
SPEED RECORDER
Filed June 15, 1925  7 Sheets-Sheet 6

Inventor:
T. Burnham
by
Attys.

Patented Aug. 6, 1929.

1,723,228

UNITED STATES PATENT OFFICE.

THOMAS BURNHAM, OF MOOSE JAW, SASKATCHEWAN, CANADA.

SPEED RECORDER.

Application filed June 15, 1925. Serial No. 37,299.

My invention relates to improvements in speed recorders for automobiles, railway trains and other vehicles and the object of the invention is to devise means for periodically recording on a chart the speeds of the particular vehicle during a predetermined number of hours, thus giving a permanent record of the performance of the vehicle.

A further object is to devise means for registering the speed of the vehicle in addition to recording such speed and a still further object is to provide means for giving a warning in case the vehicle reaches an excessive speed.

My invention consists of a speed recorder constructed and arranged all as hereinafter more particularly described and illustrated in the accompanying drawings in which.

Like characters of reference indicate corresponding parts in the different views.

1 is the casing of my recorder. 2 is a clock, the dial exposed through the front face of the casing. 3 is a warning signal light which is adapted to be thrown into circuit should the vehicle reach an excessive speed. 4 is a flexible shaft adapted to be connected at one end to the pinion 5 which is journalled in the interior of the casing and carrying at the other end the star wheel 161 which is adapted to co-act with a pin on a road wheel of the vehicle in order that the star wheel may be turned one tooth for every revolution of the road wheel. The mounting of the star wheel and the pin referred to above are not shown as they are identical in construction to the ordinary cyclometer.

The size of the pinion 5 can be varied, depending upon the size of the road wheel.

The pinion 5 meshes with a gear 6 secured to a longitudinal stub shaft 7 extending between the end of the casing 1 and the partition 8, said shaft 7 also carrying the gear wheel 9 which is loosely mounted thereon and adapted to be operatively connected thereto by means of the ratchet wheel 10 and the pawl 11, the ratchet wheel being secured to the shaft 7 and the pawl 11 being pivotally connected to the gear 9.

The shaft 7 also carries the third gear 12 which is loose thereon and which is operatively driven thereby upon the shaft 7 being rotated in the reverse direction through the medium of the ratchet wheel 13 and the pawl 14, the pawl being pivotally connected to the gear 12 and the ratchet wheel secured to the shaft 7, the teeth of the ratchet wheel 13 being oppositely disposed to the teeth of the ratchet wheel 10.

The gear 9 meshes with the gear 15 secured to the stub shaft 16 which is suitably journalled in the casing and such gear wheel 15 meshes with the gear wheel 17 on the longitudinal stub shaft 18 which is also suitably journalled in the casing.

The gear 12 meshes with an idler 19 journalled on the bracket 20 and such idler in turn meshes with a second gear 21 on the shaft 16.

22 is a pinion on the shaft 18 meshing with a gear 23 on the end of the main spring winding shaft 24 which is journalled at one end in the partition 8, and the other end in the bracket 25.

26 is a sleeve loosely mounted on the shaft 18 and provided with the radially extending tooth 27, the end of the sleeve adjacent the pinion 22 being provided with a disc 28 with the laterally directed pin 29. 30 is a cut away portion on the periphery of the disc 28, said portion extending for substantially one-quarter of the circumference of the disc and adapted to permit non-functioning of the disc 28 for one-quarter turn of the disc 31 which is secured to the shaft 18. A laterally extending pin 32 is provided on the disc 31 which extends into the cut away portion 30 of the disc 28, being adapted to engage the end walls thereof in order to rotate the said disc upon the rotation of the shaft 18. 33 is a longitudinally extending drum shaft journalled in the casing 1 and carrying at the end adjacent the partition 8 the ratchet wheel 34 which has an interrupted portion 35 on its periphery for preventing the ratchet wheel being rotated more than one revolution, as will hereinafter appear. The ratchet wheel 34 is secured to the shaft 33.

36 is a helical spring secured at one end to the shaft 33 and at the other end to the partition 8. 38 is a pin on the ratchet wheel 34 adapted to engage the stop 39 on the face of the partition 8, the pin 38 engaging the stop 39 when the ratchet wheel is in its initial position.

Figure 14:
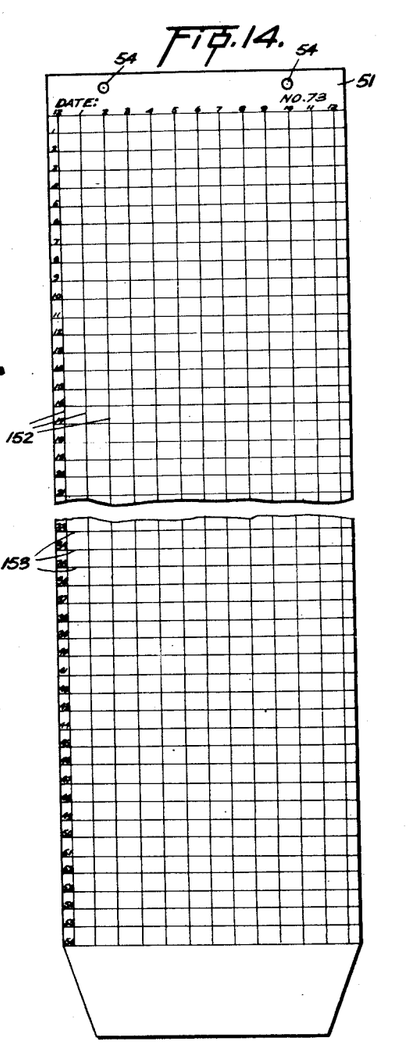
Fig. 14 is a plan view broken away intermediately of the recording chart.

40 is a pawl pivoted in the casing 1 and adapted to engage the teeth of the ratchet wheel 34, said pawl being actuated through the medium of the rod 41 which is pivotally connected thereto and to the lever 42 secured to the longitudinal shaft 43 which is turned by a disc 44 through the medium of the pin 45 thereon engaging a lever 46 secured to the end of the shaft 43. 47 is a chart carrying drum rotatably mounted on the drum shaft 33, the periphery of said drum being covered with flexible resilient material 48 and such periphery having a longitudinal indenture 49 therein adapted to receive the slotted spindle 50 which is journalled in the end walls of the drum, the slot in the spindle being adapted to receive one end of the chart 51 which is passed around the drum and secured at its other end thereto by means of the plate 52 which is detachably held in place by the set screws 53, said chart being provided with a plurality of holes 54 (Figure 14) through which the pins extend. One end of the spindle 50 is provided with a wheel 55 by means of which the spindle may be turned to tighten up the chart on the drum, the periphery of the wheel being serrated and adapted to be engaged by the plunger 56 which is slidable in the casing 57 and spring-held in engagement with such wheel.

58 is a heart shaped cam adapted to be secured to the drum shaft 33 and 59 is a roller journalled at one end on the arm 60 which is pivotally connected at its other end to one of the end walls of the drum 47, said roller being spring-held in engagement with the heart shaped cam by means of the spring 61 which is secured at one end to the arm 60 and at the other end to the end wall of the drum 47.

62 is an arm pivotally connected at one end to the partition 8 and adapted to extend adjacent to the disc 28 so as to be capable of engaging the pin 29 in order to turn the disc 28 one-quarter turn with respect to the disc 31. 63 is a spring for holding the arm 62 in engagement with the pin.

In order to hold the drum in position against rotation a sleeve 64 is provided, rotatably mounted on the shaft 43 and having at one end the lever 65 which carries the roller 66 which is adapted to roll on the periphery of the disc 44 and upon dropping into a recessed portion 67 in the periphery of the disc permitting the sleeve 64 to turn and consequently turn its connected arm 68 which is connected by means of the rod 69 with an upwardly extending lever 70 which is pivoted at its lower end in the casing and the upper end of the lever 70 is provided with a tooth 71 which is adapted to engage the teeth of the toothed plate 72 which is secured to the end of the drum.

73 is a gear secured to the end of the drum 47 and adapted to mesh with the gear 74 on the stub shaft 75. The shaft 75 also carries the gear 76 which meshes with the pinion 77 secured to the digit drum 78 which is freely mounted on the shaft 79. 80 is a smaller gear on the shaft 75 adapted to mesh with the gear 81 secured to the ten's drum 82 of the speed indicator, said drum 82 being also freely mounted on the shaft 79.

The ratio of the respective gears for the speed indicator will be apparent: For every revolution of the digit drum 78 the ten's drum 82 will be turned one-sixth, assuming that the maximum figure at which it is desired to read the speed will be sixty miles per hour. 83 is a plate secured to the end of the shaft 75 and provided with an insulated portion 84 on its periphery and 85 is a brush insulated from its mounting 86 and adapted to engage the periphery of the plate 83, said brush 85 being in circuit with the warning lamp 3 and such lamp lighted when the brush engages the metallic portion of the periphery of the plate 83, said lamp being out of circuit when the brush 85 engages the insulated portion 84 of such plate.

87 is a pinion on the end of the shaft 24 remote from the gear 23, said pinion meshing with a planetary gear 88 which is loose on the longitudinal shaft 89 which is suitably journalled in the casing. 90 is a bevelled gear secured to the shaft 89 and meshing with bevelled pinions 91 journalled in the planetary gear 88. 92 is an opposed bevelled gear meshing with the pinions 91 and secured to the brake drum 93 which is rotatably mounted on the shaft 89. 94 is a brake band extending about the drum 93 and connected at one end to the bracket 95. The other end of the brake band is connected to the slidable spindle 96 and 97 is a spring mounted on the spindle 96 above the bracket 95 and interposed between it and the nut 98 for tensioning the brake band with respect to the drum. Although I have shown a particular tensioning device for the brake band it is to be understood that any suitable tensioning device could be used therefor.

99 is a spring casing rotatably mounted on the shaft 89 and 100 is a gear secured to the periphery thereof. 101 is a helical spring secured at one end to the interior of the spring casing and at the other end to the shaft 89. 102 is a longitudinal stub shaft suitably journalled in the casing 1, said shaft carrying the disc 44 at one end and the pinion 103 in the vicinity of the other end, said pinion meshing with the gear 100 on the spring casing. 104 is a gear secured to the shaft 102 and meshing with the pinion 105 on the stub shaft 106. 107 is a gear secured to the stub shaft 106 meshing with a pinion 108 on the stub shaft 109, the other end of the stub shaft 109 carrying a worm wheel 110 which meshes with a vertical worm 111 on a governor fan spindle 112, the stub shaft 109 being also suitably journalled in the casing. The governor fan spindle 112 is suitably journalled in the vertical bracket 113 and the upper end of the fan spindle is provided with the fan 114.

115 is a second disc on the shaft 102, said disc being of preferably smaller diameter than the disc 44 and being provided with a similarly recessed portion 116 extending inwardly from its periphery.

117 is a hooked member having a V-shaped leg 118 adapted to rest on the periphery of the disc 115 and the apex of the V-shaped leg being received into the recessed portion 116 upon such disc being turned into the required position. The hooked extremity 119 of the member 117 is adapted to engage a blade of the fan 114. When this takes place the other end 120 of the member 117 being bent horizontally and being adapted to engage a lug 121 on the disc 122 which is secured to the second hand shaft 123 of the clock 2, said member 117 being pivotally mounted on the casing of the clock 2. 124 is a transverse shaft suitably journalled in the casing 1 and provided at one end with a worm wheel 125 adapted to mesh with the worm 126 secured to the minute hand shaft 261 of the clock 2, the other end of the shaft 124 carrying the toothed wheel 127 meshing with the longitudinal slidable rack 128 which is supported in the frame 129. 130 is a transverse plate provided with longitudinal slots 131 through which upwardly extending lugs 132, secured to the rack 128, freely extend. 133 is a lug on the plate 130 and 134 is a leaf spring extending between the lug 133 and the lugs 132 for normally holding the plate 130 in its retracted position. 135 is a needle on the edge of the plate 130 adjacent to the drum 47. 136 is a spring secured at one end to the frame 129 and at the other end to a depending lug 137 on the rack 128, said spring being adapted to restore the rack to its initial position.

The teeth of the tooth wheel 127 are interrupted at 138 in order to permit the return of the rack under the influence of the spring.

139 is a shaft suitably journalled on the frame 129 and carrying the upwardly extending bracket members 140 to which is secured a longitudinal plate 141 adapted to engage the outer face of the plate 130, said shaft 139 being cranked in the vicinity of the planetary gear 88 in order to clear the same. The end of the shaft 139 adjacent to the spring case 99 carries a depending arm 142 which is pivotally connected to the link 143 which is in turn pivotally connected to the lever 144 which is pivoted on the bracket 145. The upper end of the lever 144 is provided with a laterally extending pin 146 which is adapted to engage the periphery of the disc 115 and 147 is a spring secured at one end to the lever 144 and at the other end to the casing 1 in order to keep the pin 146 in engagement with the disc 115 and to cause such pin to be inserted into the depressed portion 116 upon the disc 115 turning into the required position.

148 is a second pinion on the shaft 24 adapted to mesh with the chain of gears 149 which are operatively connected to the shaft 150 which carries a cranked plate 151 adapted to be connected with total and trip mileage register.

The construction of the total and trip mileage register is not shown as it forms no part of the present invention, there being many such devices on the market suitable for this particular purpose.

In constructing my chart I preferably graduate it as follows:

I divide the chart longitudinally into a series of spaced apart lines 152 representing the hours on the clock face and I divide the chart into a series of intersecting spaced lateral lines 153 representing the speed in miles per hour. Thus when the needle perforates the chart as will hereafter be disclosed the perforation will indicate the speed of the vehicle by the lateral line and the time of such speed by the longitudinal line.

The operation of my device is as follows:

Assuming that the pinion 5 is rotated by the star wheel 161 in a clock-wise direction which should be so arranged as to correspond with the forward motion of the vehicle the gear 5 will rotate the intermeshing gear 6 in a counter-clockwise direction and consequently rotate the shaft 7 in the same direction. Through the medium of the pawl 11 engaging the ratchet 10 the gear 9 will be rotated in the same direction as the shaft 7 and its intermeshing gear 15 will be rotated in a clock-wise direction which in turn rotates the gears 17 and its attached shaft 18 in a counter-clockwise direction, thus through the medium of the clutch mechanism comprising the disc 28 and 31 will rotate the sleeve 26 in a counter-clockwise direction so that each revolution of the sleeve will, through the medium of the single tooth 27 engaging the teeth of the ratchet wheel 34 turn such ratchet wheel one tooth. The ratio of the train of gears above described is so arranged that for every 88 feet travelled by the vehicle the sleeve 26 will be rotated one revolution, consequently turning the ratchet wheel 34 one tooth for every 88 feet travelled by the vehicle.

Should the vehicle be driven backwards the pinion 5 will be rotated in a counter-clockwise direction, thus rotating the gear 6 and attached shaft 7 in a clock-wise direction, with the result that the pawl 11 will ratchet on the ratchet wheel 10, causing no driving connection between the ratchet and the gear 9, but as the pawl 14 on the gear wheel 12 is set oppositely to the pawl 11 such pawl 14 will be engaged by the ratchet wheel 3 and constitute a driving connection between it and the gear 12 so that the gear 12 will be rotated in a clock-wise direction, rotating the intermeshing idler pinion 19 in a counter-clockwise direction and the gear 21 meshing with the idler pinion 19 in a clock-wise direction, thus rotating the shaft 18 and its connected gear 15 in a clock-wise direction with the result that its intermeshing gear 17 will be rotated in a counter-clockwise direction as it would be were the other train of gears employed. When this occurs the rotation of the gear 15 merely turns the gear 9 freely about the shaft 7.

In order to wind the spring 101 in the spring case 99 the pinion 22 on the shaft 18 meshes with a gear 23 on the shaft 24 and thus the rotation of the shaft 18 through the medium of the gear 17 rotates the shaft 24. The other end of the shaft 24 with the pinion 87 thereon meshes with the planetary gear 88 and the bevelled pinions 91 thereon mesh with the respective bevelled gears 90 and 92, thus driving the gear 90 which is secured to the shaft 89, turning the shaft in a counter-clockwise direction, thus winding the spring 101 to its full extent. When the spring is fully wound up so that its tension equals the tension of the spring 97, tensioning the brake band 94, the brake drum 93 will slip relatively to the brake band 94 and thus permit the rotation of the held bevelled gear 92 which will permit the bevelled pinions 91 to revolve as the planetary gear 88 revolves without imparting any corresponding motion to the gear 90. This prevents the spring being over-wound.

The gear 100 meshing with the pinion 103 on the shaft 102 rotates such shaft and through the medium of the gear 104 thereon the pinion 105 on the shaft 106 is rotated and the gear 107 on the shaft 106 rotates the pinion 108 on the shaft 109, thus rotating the worm wheel 110 on such shaft 109 with the consequent rotation of the worm 111 on the fan spindle 112, thus the fan 114 is rotated. The fan is normally held against rotation by the hooked end 119 of the hook member 117 engaging a blade of such fan. When this occurs the apex of the leg 118 of the member 117 is disposed in the recessed portion 116 of the plate 115. As the other end 120 of the member 117 is lifted once a minute or once for each revolution of the disc 122 on the second hand shaft 123 through the medium of the lug 121, then once in each minute as the member 117 is lifted the leg 118 is disengaged from the recessed portion 116 of the plate 115 and simultaneously the hooked end 119 disengages from the fan blade, thus permitting the fan to rotate under the influence of the spring, which necessarily permits the rotation of the shaft 102. The fan continues to rotate until the plate 115 makes one revolution, bringing the recessed portion again into position so that the apex of the leg 118 will drop thereinto, when the hooked end 119 again engages the fan blade and stops the fan and the remaining mechanism connected therewith.

The gearing between the gear 104 and the fan is provided for speeding up the latter so that it will revolve at a considerable speed, say 600 revolutions per minute.

During the rotation of the shaft 102 its connected plate 44 will be rotated until the recessed portion 67 comes opposite the roller 66 on the arm 65, when the roller will drop into such recessed portion, thus swinging the arm 65 the required extent to turn the sleeve 64 and its attached arm 68 sufficiently to draw the lever 70 out of engagement with the toothed plate 72, when the drum 47 is released. When this occurs the spring held lever 60, acting through the medium of the roller 59 on the heart shaped cam 58 will turn the drum to the position of the ratchet wheel 34, the roller 59 finally entering the cleft 154 in the heart-shaped cam.

This having occurred, further rotation of the plate 44 will cause the pin 45 to engage the lever 46 on the longitudinal shaft 43 and thus turn the shaft 43 and its attached lever 42 which will move the rod 41 forward and disengage the pawl 40 from the teeth of the ratchet wheel, permitting such ratchet wheel to be restored to its initial position under the influence of the spring 36.

It will be understood that the drum 47 will, as above stated, move to the position of the ratchet, for instance, as one tooth picked up by the ratchet corresponds to 88 feet motion of the vehicle if the ratchet wheel 34 is rotated 30 teeth by the single tooth 27 on the sleeve in any one minute, this will indicate 30 miles per hour, the drum moving to the corresponding position. When the drum moves as above described it will turn the gears 73, 74, 76, pinion 77 and gears 80 and 81 so as to turn the digit and tens drums of the speed indicator into such position that the speed travelled will be indicated thereon.

When the plate 115 is turned as above described the recessed portion 116, prior to its completing its revolution, comes opposite the pin 146 on the lever 144. When this occurs under the influence of the spring 147 the pin 146 is forced into the recessed portion 116. Through the link 143 being connected to the lower end of the lever 144 the arm 142 is swung away from the lever 144, thus turning the shaft 139 in a clockwise direction, with the consequent swinging of the bracket 140 and the plate 141 with the result that the plate 141 will force the needle plate 130 forwardly and cause the needle 135 to perforate the chart. As the plate 115 turns further the pin 146 rides up the wall of the recessed portion onto the periphery of the plate 115, thus restoring the lever 140 and its connected lever 142 to the initial position, turning the shaft 139 in a counterclockwise direction and consequently swinging the plate 141 out of engagement with the needle plate 130 which is restored to its initial position under the influence of the spring 134 when the needle 135 will be disengaged from the chart. The worm 126 on the minute hand shaft 261 has only one tooth which engages the tooth of the worm wheel 125 on the transverse shaft 124 and thus for every revolution of the minute hand, or in other words, every minute, the worm wheel 125 will be turned one tooth. As the shaft 124 carries the toothed wheel 127 which engages with the rack 128, every hour the rack will be moved along a predetermined extent, depending upon the divisions on the chart. As above described, the needle plate 130 is secured to the end of the rack and consequently such needle plate will be moved across the chart a certain extent every hour.

The plate 141 is sufficiently long to engage the needle plate 130, no matter at which end of its run it is positioned, and thus the chart will be perforated by the needle 135 at one minute intervals, across its entire width.

Figure 1:
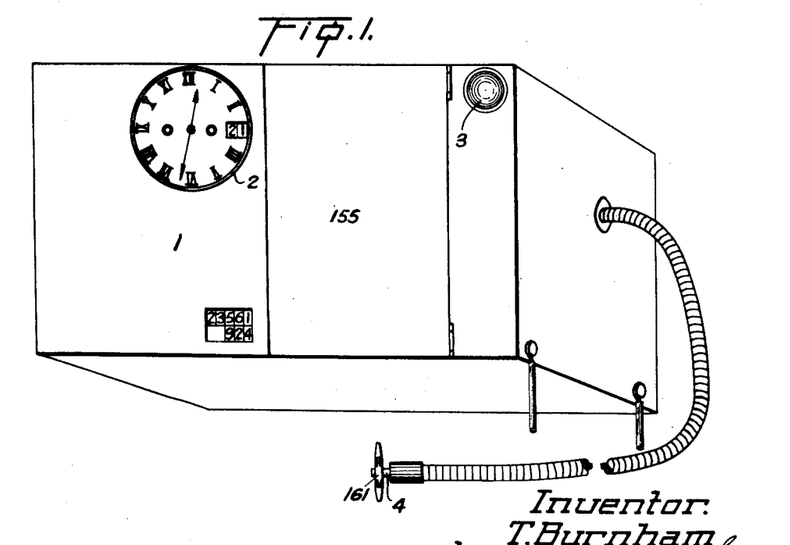
Fig. 1 represents a perspective view of a device constructed according to my invention.
Figure 2:
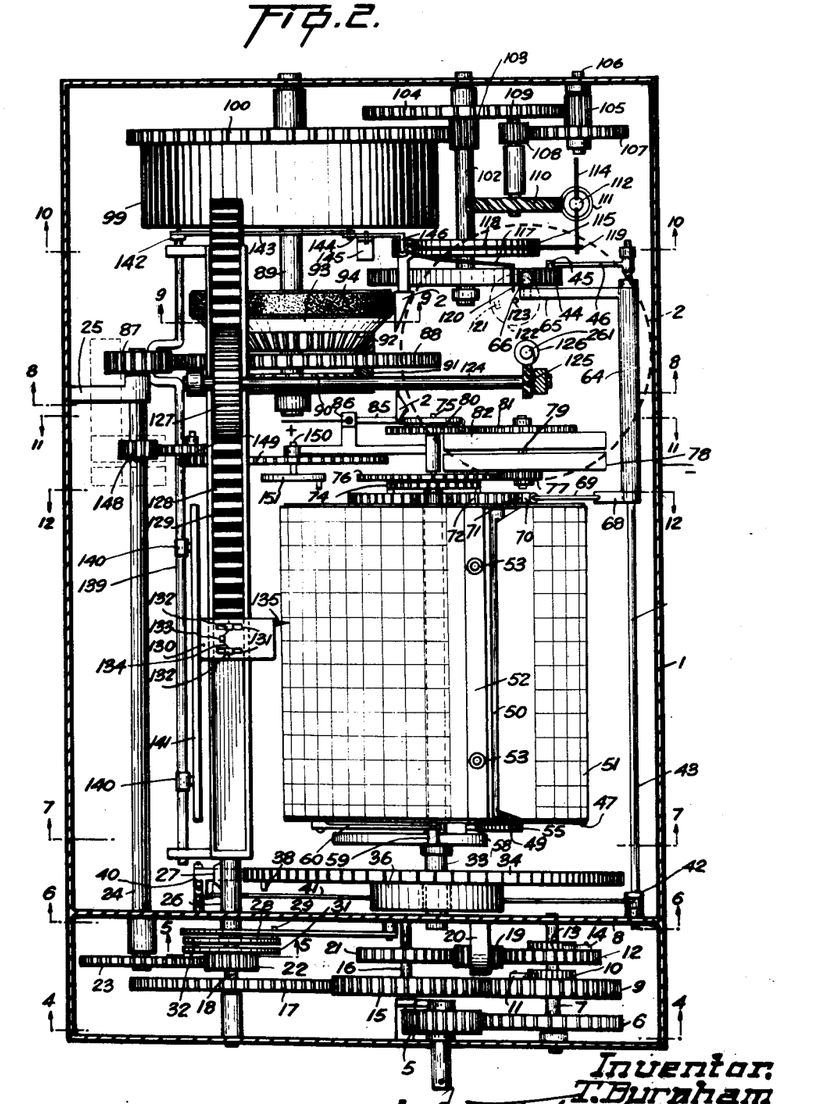
Fig. 2 is a horizontal section therethrough.
Figure 3:
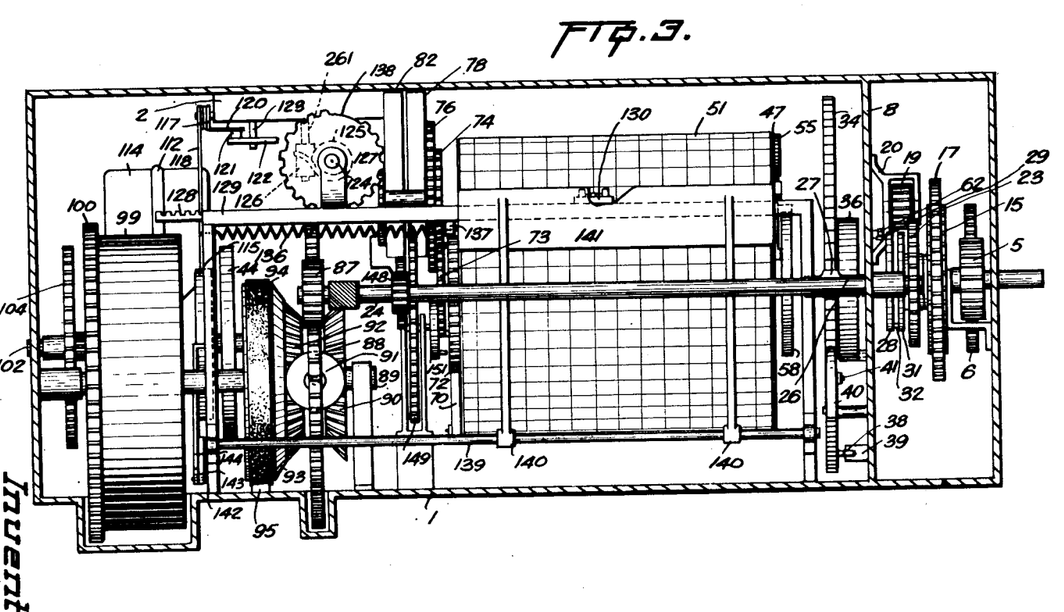
Fig. 3 is a longitudinal vertical section.
Figure 4:
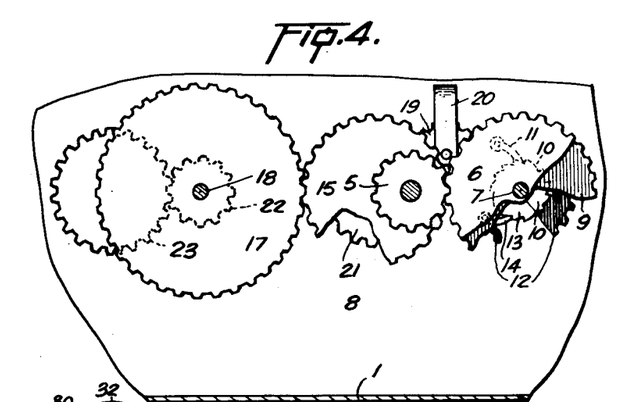
Fig. 4 is a vertical cross section through the line 4—4 Figure 2.
Figures 5, 6:
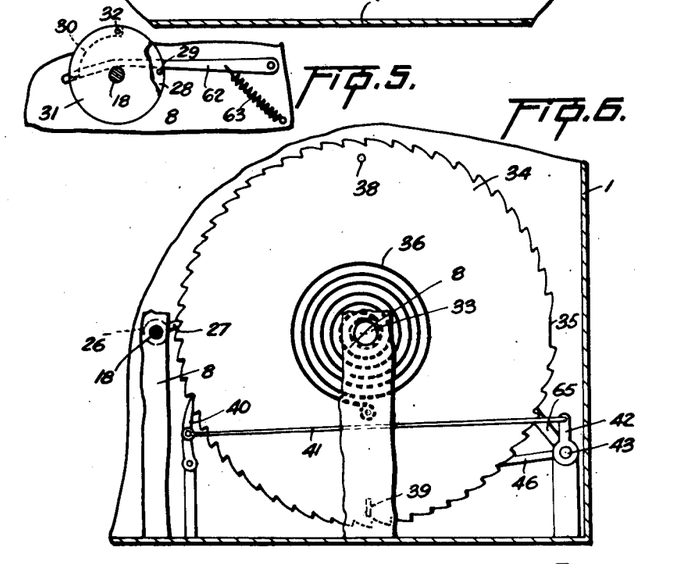
Fig. 5 is a fragmentary vertical cross section through the line 5—5 Figure 2.
Fig. 6 is a vertical cross section through the line 6—6 Figure 2.
Figure 7:
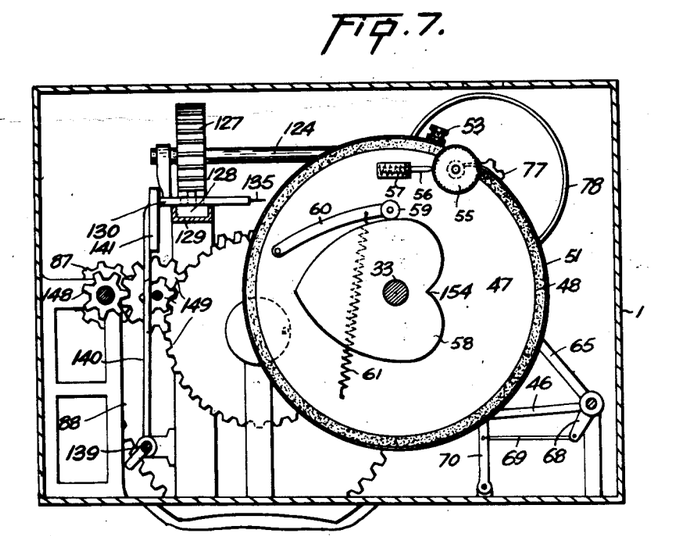
Fig. 7 is a vertical cross section through the line 7—7 Figure 2.
Figure 8:
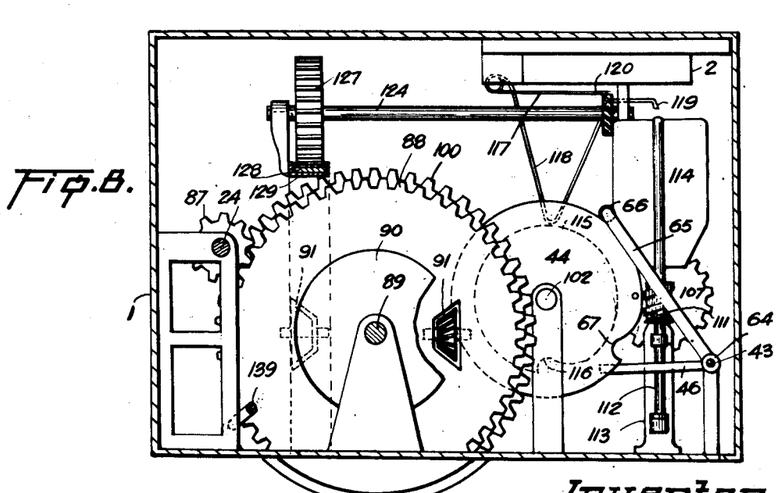
Fig. 8 is a similar section through the line 8—8 Figure 2.
Figure 9:
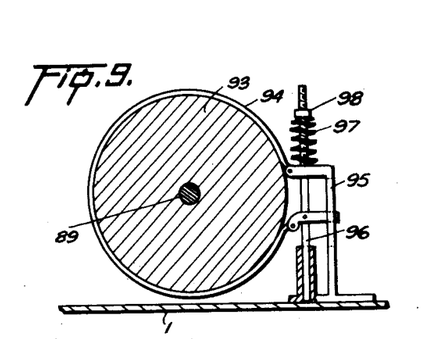
Fig. 9 is a fragmentary vertical cross section through the line 9—9 Figure 2.
Figure 10:
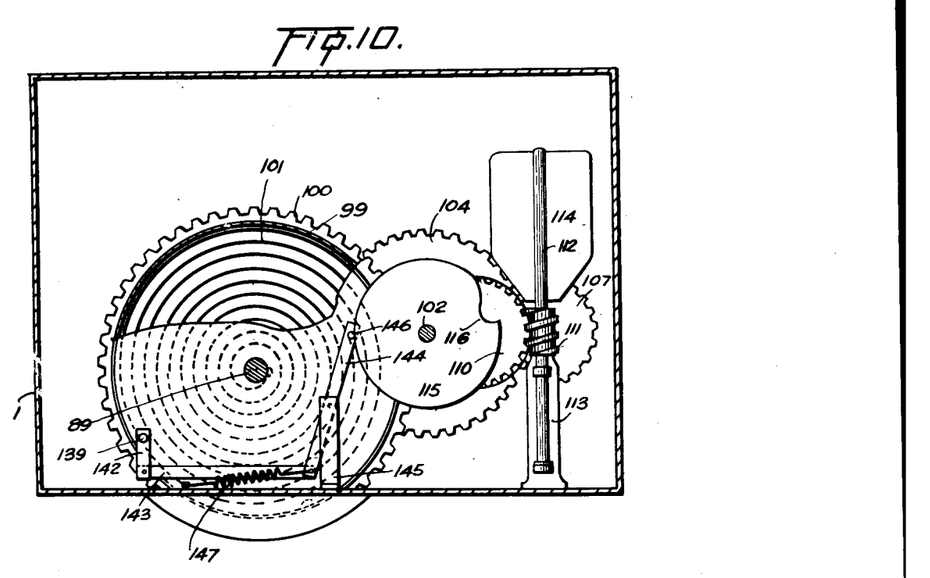
Fig. 10 is a vertical cross section through the line 10—10 Figure 2.
Figure 11:
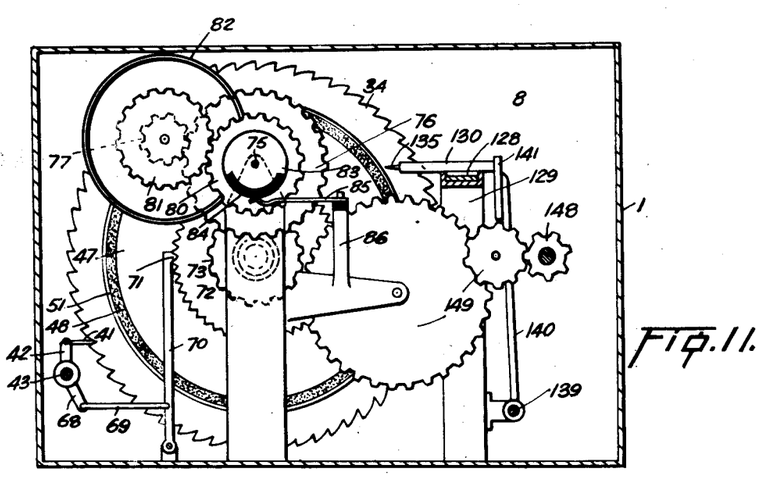
Fig. 11 is a similar section through the line 11—11 Figure 2, only looking in the opposite direction.
Figure 12:
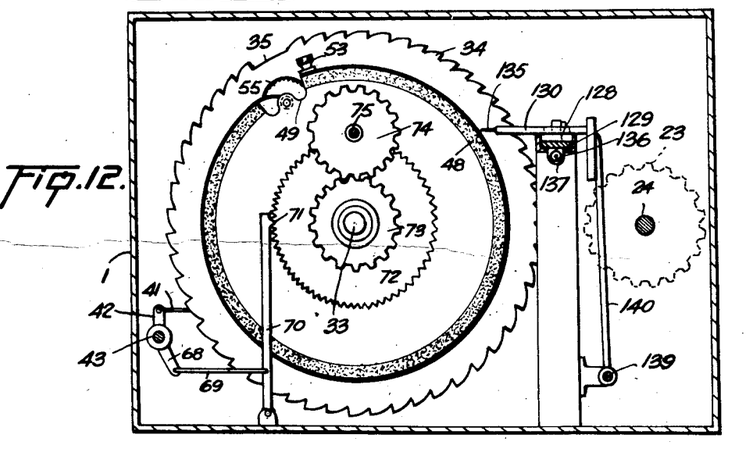
Fig. 12 is a vertical cross section through the line 12—12 Figure 2, looking the same direction as Figure 11.
Figure 13:
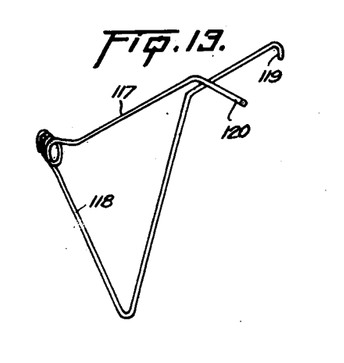
Fig. 13 is a perspective detail of the device for controlling the actuation of the governor fan.

Referring to Figure 5 of the drawings the disc 28 is permitted one-quarter turn freedom in its connection with the disc 31 so that when this device is functioning the single tooth 27 is always out of engagement with the teeth of the ratchet wheel 34, the lever 62 engaging the pin 29 holds back the disc 28 until an operative connection is established.

155 is a door hinged to the front of the casing and adapted to be opened to insert the chart 51 thereinto to apply it to the drum 147. This is achieved by inserting the screws 53 into the holes 54 in the chart and applying the plate 52 thereto, screwing it down the required extent, then winding the chart around the drum and inserting the loose end into the slot in the spindle 50, then by turning the wheel 55 by hand in the required direction the chart is tightened up and held in its adjusted position by the spring-held plunger 56.

The pinion 148 meshing with the train of gears 149 rotates the crank wheel 151 in order that the trip and season mileage indicator which is connected thereto is actuated. The gear ratio of the gears 149, pinion 148 and gear 23 are so arranged that the speed of the cranked wheel 151 will correspond with the speed of rotation of the shaft 18, the ratio being 1 to 60 of the shaft 18.

Although I have described my device as provided with a chart divided into twelve one hour graduations, it is to be understood that it could with equal facility be constructed so as to operate on any other interval of time basis and also although I have described the device functioning every minute this could be readily changed to operate at either longer or shorter intervals of time, depending upon the requirements.

From the above description it will be apparent that I have devised an effective device that will record the speed of the vehicle travelled in predetermined intervals of time for the number of hours for which the chart is intended, the device working on the principle of the actual distance travelled over the road in a given time and calculated mechanically, such being an improvement over the present system of centrifugal force in so far as accuracy is concerned. Moreover, the device in addition to indicating the speed of the vehicle will provide a permanent record of such speed.

What I claim as my invention is:

1. In a vehicle speed recorder, the combination with a chart, of a clock, means periodically actuated by the clock for marking on the chart the speed of the vehicle at each particular time interval, spring operated means for controlling the functioning of the clock actuated marking means, and means for controlling the position of the chart with respect to the marking means whereby the speed of the vehicle is periodically marked on the chart.

2. In a vehicle speed recorder, a shaft, a speed recording chart drum rotatable on the shaft, means for periodically marking the chart to give the speed of the vehicle at each particular time interval, means for rotating the shaft in each time interval a portion of a revolution corresponding with the speed of the vehicle, and means between the drum and shaft for rotating the drum to a corresponding position prior to the marking means functioning.

3. In a vehicle speed recorder, a shaft, a speed recording chart drum rotatable on the shaft, means for periodically marking the chart to give the speed of the vehicle at each particular time interval, means for rotating the shaft in each time interval a portion of a revolution corresponding with the speed of the vehicle, means between the drum and shaft for rotating the drum to a corresponding position prior to the marking means functioning, and means for restoring the shaft to its initial position during each time interval.

4. In a vehicle speed recorder, a shaft, a speed recording chart drum rotatable on the shaft, means for periodically marking the chart to give the speed of the vehicle at each particular time interval, means for rotating the shaft in each time interval a portion of the revolution corresponding with the speed of the vehicle, means between the drum and shaft for rotating the drum to a corresponding position prior to the marking means functioning, and spring actuated means for restoring the shaft to its initial position during each time interval.

5. In a vehicle speed recorder, a shaft, a speed recording chart drum rotatable on the shaft, means for periodically marking the chart to give the speed of the vehicle at each particular time interval, a ratchet wheel secured on the shaft, a single tooth wheel coacting therewith, means for driving the single tooth wheel, means for rendering the single tooth wheel inoperative during a portion of the revolution of the ratchet wheel, and means for restoring the ratchet wheel to its initial position during the non-functioning of the single tooth wheel with respect to the ratchet wheel.

6. In a vehicle speed recorder, a shaft, a speed recording chart drum rotatable on the shaft, locking means for normally preventing rotation of the drum, means for periodically marking the chart to give the speed of the vehicle at each particular time interval, a ratchet wheel secured on the shaft, a single tooth wheel meshing with the ratchet wheel for turning the latter into the required position, means for releasing the drum locking means, means for turning the drum into a position corresponding with the position of the ratchet wheel, means for relocking the drum, means for releasing the ratchet, and means for restoring the ratchet to its initial position.

7. In a vehicle speed recorder, a shaft, a speed recording chart drum rotatable thereon, a ratchet wheel secured on the shaft, a single tooth wheel meshing with the ratchet wheel for turning the ratchet wheel a portion of a revolution, a heart shaped cam on the shaft, a spring-held arm pivoted on the drum and coacting with the cam's periphery whereby the drum is rotated to the position of the ratchet wheel, and a helical spring anchored at one end and its other end secured to the shaft.

8. In a vehicle speed recorder, a shaft, a speed recording chart drum rotatable thereon, a ratchet wheel secured on the shaft, a single tooth wheel meshing with the ratchet wheel for turning the ratchet wheel a portion of a revolution, a disc secured to the single tooth wheel having a portion of its periphery cut away, a journalled stub shaft, means for driving the stub shaft, a disc on the stub shaft, a pin thereon extending into the cut away portion of the disc on the single tooth wheel, and means for retarding and advancing the rotation of the latter disc.

9. In a vehicle speed recorder, a rotatable chart carrying drum, a detachable chart thereon, chart marking means normally inoperative and slidable substantially parallel to the axis of the drum, said marking means being also slidable transversely with respect to the axis of the drum, and means engaging the marking means sliding it into engagement with the chart on the drum.

10. In a vehicle speed recorder, a rotatable chart carrying drum, a detachable chart thereon, chart marking means normally inoperative and slidable substantially parallel to the axis of the drum, said marking means being also slidable transversely with respect to the axis of the drum, a swingable plate extending substantially the length of the drum and coacting with the slidable marking means, and means for oscillating the plate.

11. In a vehicle speed recorder, a rotatable chart carrying drum, a detachable chart thereon, a frame extending longitudinally of the drum, a slidable rack thereon, a plate slidable transversely on the rack, chart marking means on the plate, said plate normally spring-held with the marking means out of engagement with the chart, means for sliding the plate forwardly to cause the marking means to engage the chart, a toothed wheel engaging the rack, and means for periodically rotating the wheel a portion of a revolution.

12. In a vehicle speed recorder, a rotatable chart carrying drum, a detachable chart thereon, a frame extending longitudinally of the drum, a slidable rack thereon, a plate slidable transversely on the rack, chart marking means on the plate, said plate normally spring-held with the marking means out of engagement with the chart, means for sliding the plate forwardly to cause the marking means to engage the chart, a toothed wheel engaging the rack, a clock, and means for rotating the toothed wheel from the clock.

13. In a vehicle speed recorder, a rotatable chart carrying drum, a detachable chart thereon, a frame extending longitudinally of the drum, a slidable rack thereon, a plate slidable transversely on the rack, chart marking means on the plate, said plate normally spring-held with the marking means out of engagement with the chart, means for sliding the plate forwardly to cause the marking means to engage the chart, a toothed wheel engaging the rack, a clock, a minute shaft thereon, and a driving connection between the minute hand shaft and the toothed wheel.

14. In a vehicle speed recorder, a rotatable chart carrying drum, a detachable chart thereon, a frame extending longitudinally of the drum, a slidable rack thereon, a plate slidable transversely on the rack, chart marking means on the plate, said plate normally spring-held with the marking means out of engagement with the chart, means for sliding the plate forwardly to cause the marking means to engage the chart, a toothed wheel engaging the rack, a clock, means for rotating the toothed wheel from the clock, and means controlled by the clock for permitting the functioning of the means for sliding the plate into the marking position.

15. In a speed recorder, the combination with a chart and marking means therefor, of spring actuated means for actuating the marking means into the operative position, and spring actuated means for restoring the first means to a position wherein the marking means is inoperative.

16. In a speed recorder, the combination with a chart and marking means therefor, of spring actuated means for actuating the marking means into the operative position, spring actuated means for restoring the first means to a position wherein the marking means is inoperative, a clock and means for controlling the operation of the second spring actuated means by the clock.

17. In a speed recorder, the combination with a chart and marking means therefor, a spring-held lever, means for actuating the marking means from the spring-held lever, a rotatable disc having a cut away portion, a pin on the lever adapted to enter the cut away portion whereby the lever is moved into the functioning position, said lever moved into the non-functioning position upon the pin riding up onto the periphery of the disc.

18. In a speed recorder, the combination with a chart and marking means therefor, a spring-held lever, means for actuating the marking means from the spring-held lever, a rotatable disc having a cut away portion, a pin on the lever adapted to enter the cut away portion whereby the lever is moved into the functioning position, said lever moved into the non-functioning position upon the pin riding up onto the periphery of the disc, and spring actuated means for rotating the disc.

19. In a speed recorder, the combination with a chart and marking means therefor, a spring-held lever, means for actuating the marking means from the spring-held lever, a rotatable disc having a cut away portion, a pin on the lever adapted to enter the cut away portion whereby the lever is moved into the functioning position, said lever moved into the non-functioning position upon the pin riding up onto the periphery of the disc, a spring motor, a control fan geared thereto, a journalled shaft upon which the disc is secured, said spring motor geared to the shaft, and means adapted to engage the fan for stopping the same to effect the stopping of the disc.

20. In a speed recorder, the combination with a chart and marking means therefor, a spring-held lever, means for actuating the marking means from the spring-held lever, a rotatable disc having a cut away portion, a pin on the lever adapted to enter the cut away portion whereby the lever is moved into the functioning position, said lever moved into the non-functioning position upon the pin riding up onto the periphery of the disc, a spring motor, a control fan geared thereto, a journalled shaft upon which the disc is secured, said spring motor geared to the shaft, means adapted to engage the fan for stopping the same to effect the stopping of the disc, a member adapted to engage the periphery of the disc and enter the cut away portion, and also adapted to engage the fan upon such member being positioned in the cut away portion of the disc, and means for lifting the member out of the cut away portion of the disc and out of engagement with the fan.

21. In a speed recorder, the combination with a chart and marking means therefor, a spring-held lever, means for actuating the marking means from the spring-held lever, a rotatable disc having a cut away portion, a pin on the lever adapted to enter the cut away portion whereby the lever is moved into the functioning position, said lever moved into the non-functioning position upon the pin riding up onto the periphery of the disc, a spring motor, a control fan geared thereto, a journalled shaft upon which the disc is secured, said spring motor geared to the shaft, means adapted to engage the fan for stopping the same to effect the stopping of the disc, a member adapted to engage the periphery of the disc and enter the cut away portion, and also adapted to engage the fan upon such member being positioned in the cut away portion of the disc; a clock, a second hand shaft, a disc on the second hand shaft, a lug on the disc, said lug adapted to engage a portion of the member and lift it out of the cut away portion of the disc and out of engagement with the fan.

22. In a speed recorder, the combination with a rotatable chart carrying drum and a drum position controlling ratchet wheel, of a spring motor, means for controlling the starting and stopping of the spring motor, a journalled shaft geared to the spring motor, a disc thereon having an indenture extending in from the periphery thereof, a spring for restoring the ratchet wheel to its initial position, means for preventing retrograde movement of the ratchet wheel, and means actuated by the rotation of the disc for releasing the above means.

23. In a speed recorder, the combination with a rotatable chart carrying drum and a drum position controlling ratchet wheel, of a spring motor, means for controlling the starting and stopping of the spring motor, a journalled shaft geared to the spring motor, a disc thereon having an indenture extending in from the periphery thereof, a spring for restoring the ratchet wheel to its initial position, means for preventing retrograde movement of the ratchet wheel, a pivoted pawl engaging the teeth of the ratchet wheel, a pivoted lever, a lateral pin on the disc adapted to engage the lever, and an operative connection between the lever and pawl.

24. In a speed recorder, the combination with a rotatable chart carrying drum and a drum position controlling ratchet wheel, of a spring motor, means for controlling the starting and stopping of the spring motor, a journalled shaft geared to the spring motor, a disc thereon having an indenture extending in from the periphery thereof, a spring for restoring the ratchet wheel to its initial position, means for preventing retrograde movement of the ratchet wheel, and disengagable coacting means between the drum and the disc for locking the former against rotation.

25. In a speed recorder, the combination with a rotatable chart carrying drum and a drum position controlling ratchet wheel, of a spring motor, means for controlling the starting and stopping of the spring motor, a journalled shaft geared to the spring motor, a disc thereon having an indenture extending in from the periphery thereof, a spring for restoring the ratchet wheel to its initial position, means for preventing retrograde movement of the ratchet wheel, a toothed wheel on the drum, a pivoted pawl lever adapted to engage the teeth of the wheel, a pivoted lever, a roller thereon adapted to ride on the periphery of the disc and to enter the indenture, and an operative connection between the lever and the pawl lever.

THOMAS BURNHAM.